Aug. 22, 1961 C. SCHRON 2,997,084
CLAMPING MEANS WITH SELF-ALIGNING PAD
Filed July 23, 1959 2 Sheets-Sheet 1

INVENTOR.
CHRISTY SCHRON
BY Ely, Pearne & Gordon
ATTORNEYS

Aug. 22, 1961 C. SCHRON 2,997,084
CLAMPING MEANS WITH SELF-ALIGNING PAD
Filed July 23, 1959 2 Sheets-Sheet 2
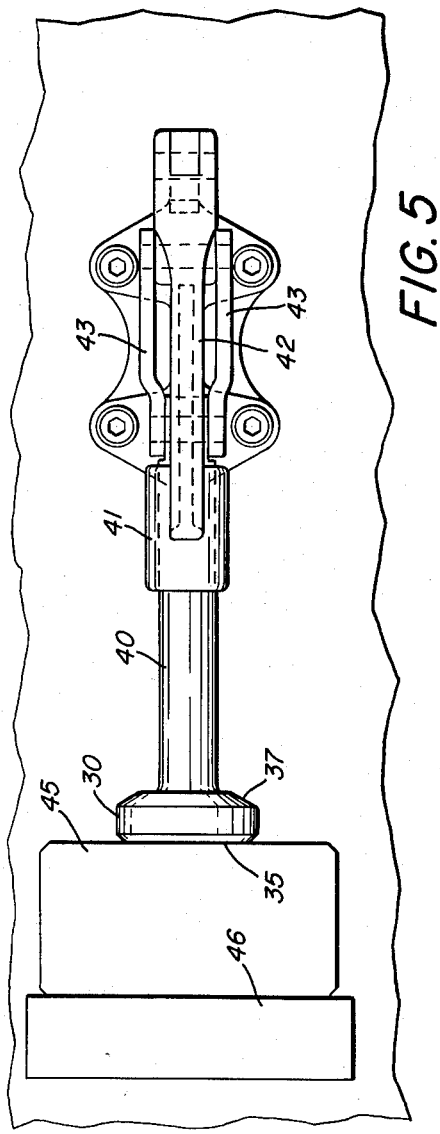
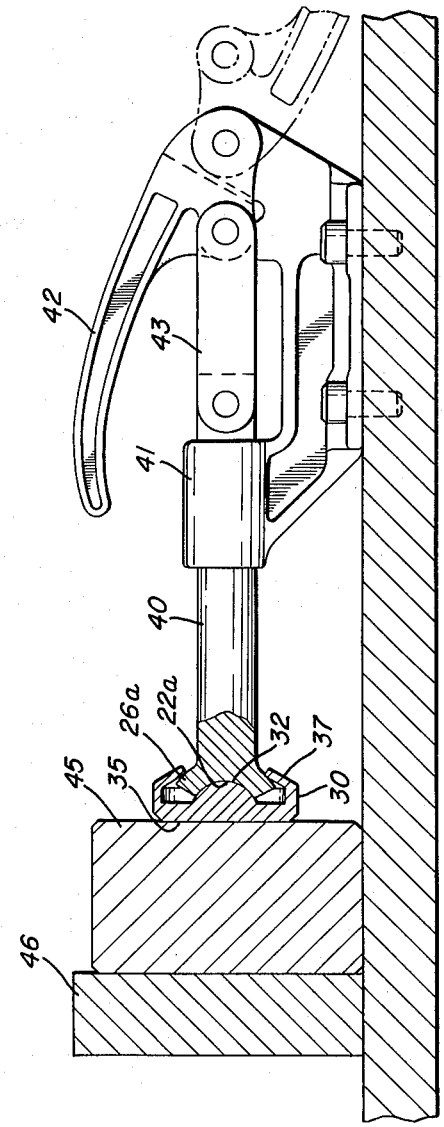
INVENTOR.
CHRISTY SCHRON
BY Ely, Pearne
& Gordon
ATTORNEYS United States Patent Office 2,997,084
Patented Aug. 22, 1961

2,997,084
CLAMPING MEANS WITH SELF-ALIGNING PAD
Christy Schron, Cleveland, Ohio, assignor to Jergens Tool Specialty Co., Cleveland, Ohio, a corporation of Ohio
Filed July 23, 1959, Ser. No. 828,972
6 Claims. (Cl. 144—297)

This invention relates to means for holding workpieces and more particularly to devices used as part of jigs, clamps and the like.

An important object of the invention is to provide a toggle pad or workpiece-engaging member which may be tightened down on workpiece surfaces which are angularly disposed without initially springing or wedging the tightened screw slightly to one side.

Another important object of the invention is to provide simple means for providing a work-engaging member at the end of a tightening screw for a jig or clamp or the like which will eliminate slight sidewise springing of the tightening screw and the need for consequent readjustment or compensation and the inconvenience and possible marring of the workpiece incident to such readjustment or compensation.

Another important object of the invention is to provide a toggle pad which, other factors being equal, provides a more secure and firm engagement of a workpiece than toggle pads heretofore provided.

A feature of the present invention is the elimination of the toggling aspect common to prior tightening screw-work-engaging elements of the prior art. Etymologically, the present devices may naturally be termed "toggle pads," but in fact all toggling action may be eliminated by the present invention to thereby realize the above advantages.

These and other objects and advantages of the invention will become more fully apparent from the following description of one presently preferred embodiment of the invention. It should be understood that the invention is susceptible of modification and change without departing from the fair teaching thereof.

In the drawings:

FIGURE 5 is a plan view of a clamping application showing a toggle pad device employed on an associated tightening element other than a tightening screw.

FIGURE 6 is a partly broken away side elevation of the apparatus shown in FIGURE 5.

Figure 1:
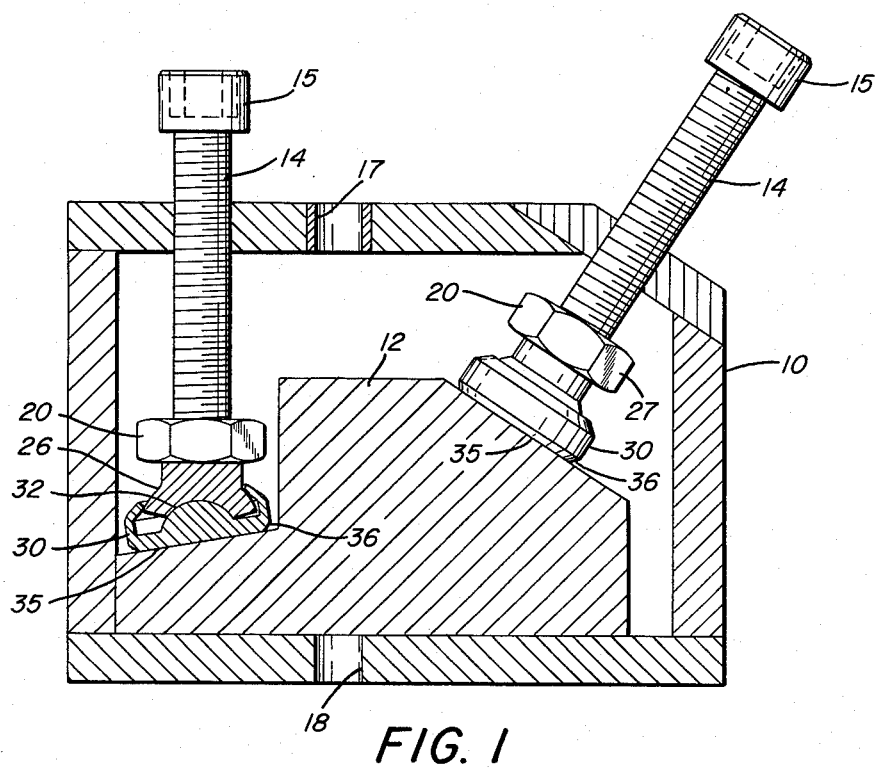
FIGURE 1 is a sectional view of a jig and workpiece with two toggle pad devices and associated tightening screws employed therein as contemplated by the invention.
Figure 2:
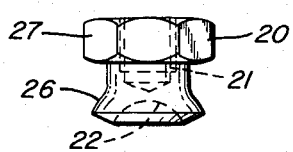
FIGURE 2 is a detail view of a body forming part of a toggle pad device contemplated by the invention.
Figure 3:
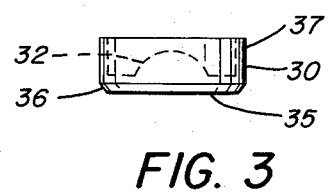
FIGURE 3 is a detail view of another member forming part of the same toggle pad device.

The illustrated preferred embodiment selected to illustrate the invention includes a jig 10 which may be used for drilling holes in a workpiece 12 which is positioned by the jig. Two tightening screws 14 are illustrated and are adapted to be turned down by means of the Allen heads 15. The bolts are received in tapped holes in the jig 10 and are disposed so as to engage the workpiece in the desired manner for firmly supporting it in accurately located position during machining operations such as drilling through the vertical extent of the workpiece. Thus, the jig is illustrated as having a drill guide bushing 17 and an additional aligned hole 18.

Of course, the invention also contemplates the use of the tightening screws 14 in C-clamps or the like rather than in structure more properly designated as jigs. In either event, however, it will be understood that the tightening screws are used with oppositely disposed, rigidly associated clamp jaws or jig jaws or elements, the tightening screws being threadedly engaged with one of the elements and disposed to clamp workpieces against the oppositely disposed, rigidly associated element, such as for example the top and bottom plates illustrated in connection with the jig 10.

Each of the tightening screws 14 is provided at its end with a body generally indicated by the reference numeral 20, the body having a tapped recess 21 formed therein for receiving its associated tightening screws 14. Also formed on the body 20 is a concave spherical seat 22. Connected to the body is a cup-shaped work-engaging member 30. The interior of the cup bottom is shaped as a convex spherical seat 32 which is receivable in the concave spherical seat 22 of the body 20. In one important aspect of the invention, the convex spherical seat 32 and the concave spherical seat 22 are of like radius so that surface contact rather than line contact will be established therebetween when the two spherical surfaces are in seating relationship with each other.

A work-engaging surface 35 on the member 30 is adapted to engage the object being clamped or mounted in the jig or the like, such as the workpiece 12. The work-engaging surface may be chamfered or relieved as at 36. The work-engaging surface 35 intersects the center of the convex spherical seat 32.

Figure 4:
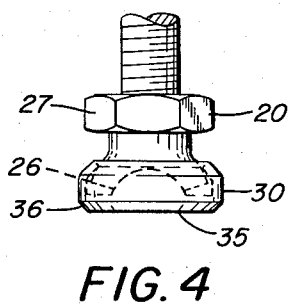
FIGURE 4 is a side elevation of a toggle pad device contemplated by the invention together with a portion of its associated tightening screw.

The member 30 may be fixed to the body 20 by peening the sidewalls 37 of the cup-shaped body 30 over the outwardly flared portions 26 on the body 20 as shown in FIGURE 4. The body 20 may be made conveniently tightenable upon its associated tightening screw 14 by wrench-engaging surfaces 27. It will be understood that alternatively the body 20 may be formed integrally with an associated tightening screw 14.

In operation, the tightening screws 14 are tightened down in the jig 10 or in an associated C-clamp or the like until the work-engaging surface 35 contacts the workpiece 12. In the case of the rightward tightening screw 14, illustrated in FIGURE 1, the angle between the surface of the workpiece 12 to be contacted and the axis of the tightening bolt 14 is exactly normal. Nevertheless there may be some tendency for the member 30 to move out of coaxial alignment with the bolt 14 due to gravity. Nevertheless, as the work-engaging surface 35 initially contacts the workpiece 12 and gradually comes into tighter and tighter contact therewith, the member 30 is moved back into coaxial alignment with the tightening screw 14 without there occurring any tendency toward a toggling action or any slight tendency toward springing of the tightening bolt 14 which would necessitate slight loosening and readjustment or compensation in order to improve as far as possible the engagement between the tightening screw and the workpiece.

Even though it is vertically disposed, turning down of the tightening screw 14, shown at the left hand side of FIGURE 1, will also be likely to result in a toggling action and an initial slight springing of the tightening screw due to the fact that the surface of the workpiece 12 which is to be engaged is not normal to the axis of the tightening screw 14. Nevertheless, with the toggle pad contemplated by the present invention, such springing or toggling does not occur even initially and no readjustment or compensation is required to eliminate or minimize such toggling or springing.

The invention has been described above in connection with the tightening screws 14. It will be evident, however, that clamping elements other than screws but also mountable for longitudinal advancement and for locking in advanced position may employ the invention. For example, shown in FIGURES 5 and 6 is a clamping element comprising a sliding rod 40 mounted for sliding movement in the bushing 41 and actuated by the toggle linkage comprising the bell crank handle 42 and link 43. A workpiece, such as the workpiece 45, is engaged between the outer end of the clamping rod 40 and a backstop 46 when the linkage is moved to the advanced or clamping position shown in solid lines in the drawings.

According to the invention the outer end of the clamping rod 40 may be threadedly affixed to or may, as illustrated in the drawings, be integrally formed with a portion equivalent to the body 20 described in connection with FIGURES 1–4. Thus there is provided a concave spherical seat 22A corresponding to the seat 22. There may also be provided an outwardly flaring portion 26A corresponding to the portion 26. This structure may receive a work-engaging member 30 identical to that previously described and including a convex spherical seat 32 engaging in the concave spherical seat 22A and also including a work-engaging surface 35 intersecting the convex spherical seat 32. Again, the member 30 is fixed to the elements associated with the concave spherical seat 22A as by peening the sidewalls 37 of the cup-shaped body 30 over the outwardly flared portion 26A at the outer end of the clamping element 40.

It will be understood that the work-engaging surface 35 can be grooved, even to the extent of defining only a plurality of high points. It is important, however, that the lands between grooves, or the high points or other surface elements which define the work-engaging plane be so disposed that the plane of work-engagement intersects the center of the convex spherical seat 32. It is in this sense that the appended claims speak of intersection of the work-engaging surface and the convex spherical seat formed on the work-engaging member.

The invention is not restricted to the slavish imitation of each and every one of the details described above which have been set forth merely by way of example with the intent of most clearly setting forth the teaching of the invention. Obviously, devices may be provided which change, eliminate or add certain specific structural details without departing from the invention.

What is claimed is:

1. A toggle pad device for the ends of tightening screws of jigs, clamps and the like comprising a body having a tapped recess therein for receiving a tightening screw, a concave spherical seat provided on said body, a cup-shaped work-engaging member, said work-engaging member being rotatably connected to said body, said work-engaging member having an interior cup bottom in the shape of a convex spherical seat receivable in said concave spherical seat, a work-engaging surface on said member intersecting the center of said convex spherical seat.

2. A toggle pad for the ends of tightening screws of jigs, clamps and the like comprising a body having a tapped recess therein for receiving a tightening screw, a concave spherical seat provided on said body, a work-engaging member, said work-engaging member being rotatably connected to said body, said work-engaging member having a convex spherical seat receivable in said concave spherical seat, a work-engaging surface on said member intersecting the center of said convex spherical seat.

3. A clamping component comprising a screw, a body fixedly supported at an end of the screw, said body having a concave spherical seat provided thereon, a cup-shaped work-engaging member, said work-engaging member being rotatably connected to said body, said work-engaging member having an interior cup bottom in the shape of a convex spherical seat receivable in said concave spherical seat, a work-engaging surface on said member intersecting the center of said convex spherical seat.

4. A clamping component comprising a screw, a body fixedly supported at an end of the screw, said body having a concave spherical seat provided thereon, a work-engaging member connected to said body in interlocked relationship therewith, said work-engaging member having a convex spherical seat receivable in said concave spherical seat, a work-engaging surface on said member intersecting the center of said convex spherical seat.

5. A clamping component comprising a clamping element mountable for longitudinal advancement and for locking in advanced position, a body fixedly supported at the end of said element, said body having a concave spherical seat provided thereon, a cup-shaped work-engaging member, said work-engaging member being rotatably connected to said body, said work-engaging member having an interior cup bottom in the shape of a convex spherical seat receivable in said concave spherical seat, a work-engaging surface on said member intersecting the center of said convex spherical seat.

6. A clamping component comprising a clamping element mountable for longitudinal advancement and for locking in advanced position, a body fixedly supported at the end of said element said body having a concave spherical seat provided thereon, a work-engaging member connected to said body in interlocked relationship therewith, said work-engaging member having a convex spherical seat receivable in said concave spherical seat, a work-engaging surface on said member intersecting the center of said convex spherical seat.

References Cited in the file of this patent

UNITED STATES PATENTS

| 1,111,386 | Hutton | Sept. 22, 1914 |
| 2,346,088 | Shobert | Apr. 4, 1944 |
| 2,432,352 | Strotz | Dec. 9, 1947 |
| 2,649,123 | Gulland | Aug. 18, 1953 |
| 2,724,298 | Olson | Nov. 22, 1955 |

FOREIGN PATENTS

| 10,217 | Great Britain | June 2, 1900 |